US005777738A

United States Patent [19]

Kulawiec

[11] Patent Number: 5,777,738
[45] Date of Patent: Jul. 7, 1998

[54] INTERFEROMETRIC MEASUREMENT OF ABSOLUTE DIMENSIONS OF CYLINDRICAL SURFACES AT GRAZING INCIDENCE

[75] Inventor: Andrew W. Kulawiec, Fairport, N.Y.

[73] Assignee: Tropel Corporation, Fairport, N.Y.

[21] Appl. No.: 818,913

[22] Filed: Mar. 17, 1997

[51] Int. Cl.$^6$ ...................................................... G01B 9/02
[52] U.S. Cl. ........................................... 356/354; 356/359
[58] Field of Search ................................... 356/354, 355, 356/357, 359, 360

[56] References Cited

U.S. PATENT DOCUMENTS

| | | |
|---|---|---|
| 3,907,438 | 9/1975 | Holeman . |
| 4,391,526 | 7/1983 | McLaughlin . |
| 4,436,424 | 3/1984 | Bunkenburg . |
| 4,606,640 | 8/1986 | Hirst . |
| 4,653,922 | 3/1987 | Järisch et al. . |
| 4,791,584 | 12/1988 | Greivenkamp, Jr. . |
| 4,898,470 | 2/1990 | Cleaveland . |
| 5,041,726 | 8/1991 | Chang et al. . |
| 5,210,591 | 5/1993 | DeGroot . |
| 5,220,403 | 6/1993 | Batchelder et al. . |
| 5,654,798 | 8/1997 | Bruning .................................. 356/354 |

FOREIGN PATENT DOCUMENTS 106769  7/1974  German Dem. Rep. .

OTHER PUBLICATIONS

"Holographically Observed Torsion in a Cylindrical Shaft" by A.D. Wilson, Applied Optics, vol. 9, No. 9, Sep. 1970, pp. 2093-2097.

"Oblique incidence interferometry applied to non-optical surfaces" by K. G. Birch, Journal of Physics E: Scientific Instruments, 1993, vol. 6, Great Britain, pp. 1045-1048.

"Measurement of Deformation in a Cylindrical Shell by Holographic Interferometry" by T. Matsumoto, K. Iwata, and R. Nagata, Applied Optics, vol. 13, No. 5, May 1974, pp. 1080-1084.

"Improved oblique-Incidence Interferometer" by P. Hariharan, Optical Engineering, vol. 14, No. 3, May-Jun. 1975, pp. 257-258.

"Interferometric surface mapping with variable sensitivity" by W. Jaerisch and G. Makosch, Applied Optics, vol. 17, No. 5, 1 Mar. 1978, pp. 740-743.

"Interferometric construction of circular gratings" by E. Leith, H. Chen, G. Collins, K. Scholten, G. Swanson, and J. Upatnicks, Applied Optics, vol. 19, No. 21, 1 Nov. 1980, pp. 3626-3630.

"Optical figure characterization for cylindrical mirrors and lenses" by Alvin D. Schnurr and Allen Mann, Optical Engineering, vol. 20, No. 3, May/Jun. 1981, pp. 412-416.

"Set of orthonormal surface error descriptions for near-cylindrical optics" by Paul Glenn, Optical Engineering, vol. 23, No. 4, Jul./Aug. 1984, pp. 384-390.

"Cylindrical lenses:testing and radius of curvature measurement" by R. Diaz-Uribe, J. Pedraza-Contreras, O. Cardona-Nunez, A. Cordero-Davila, and A. Cornejo Rodriquez, Applied Optics, vol. 25, No. 10, 15 May 1986, pp. 1707-1709.

"Testing cylindrical lenses" Joseph M. Geary, Optical Engineering, vol. 26, No. 12, Dec. 1987, pp. 1219-1224.

"Data analysis in fiber optic testing of cylindrical optics" by Joseph M. Geary, Optical Engineering, Mar. 1989, vol. 28, No. 3, pp. 212-216.

(List continued on next page.)

*Primary Examiner*—Samuel A. Turner
*Attorney, Agent, or Firm*—Eugene Stephens & Associates

[57] ABSTRACT

Cylindrical surfaces of a test cylinder are measured with a grazing incidence interferometer. Separate measures of a test cylinder's cylindrical surface and a master cylinder's surface are made and compared to obtain absolute measures of the test cylinder's surface. Surface fitting techniques are used to discount the effects of positioning errors, and a separate measurement is used to resolve remaining ambiguities for extending the range of test cylinder sizes that can be measured with absolute dimensions.

34 Claims, 5 Drawing Sheets

OTHER PUBLICATIONS

"Interferometry on Wolter X-ray optics: a possible approach" by Joseph M. Geary, Optical Engineering, vol. 28, No. 3, Mar. 1989, pp. 217-221.

"Constant radial shearing interferometry with circular gratings" by Qing-Shin Ru, Nagaaki Ohyama, Toshio Honda, and Jumpei Tsujiuchi Applied Optics, vol. 28, No. 15, 15 Aug. 1989, pp. 3350-3353.

"Profile measurement of an aspheric cylindrical surface from retroreflection" by Ding-tin Lin and Der-shen Wan, Applied Optics, vol. 30, No. 22, 1 Aug. 1991, pp. 3200-3204.

"Profile measurements of cylindrical surfaces" by Der-Shen Wan and Ding-tin Lin, Applied Optics, vol. 32, No. 7, 1 Mar. 1993, pp. 1060-1064.

"Determination of two-dimensional planar displacement by Moire fringes of concentric-circle gratings" by Yoon-Chang Park and Seung-Woo Kim, Applied Optics, vol. 33, No. 22, Aug. 1994, pp. 5171-5176.

"Grazing incidence interferometry applied to the measurement of cylindrical surfaces" by Thomas Dresel, Johannes Schwider, Alexander Wehrhahn and Sergey Babin, Optical Engineering, Dec. 1995, vol. 34, No. 12, pp. 3531-3535.

INTERFEROMETRIC MEASUREMENT OF ABSOLUTE DIMENSIONS OF CYLINDRICAL SURFACES AT GRAZING INCIDENCE

TECHNICAL FIELD

The invention relates to the interferometric measurement of cylindrical surfaces at grazing incidence and is further directed to the measurement of absolute dimensions of these surfaces.

BACKGROUND

Interferometers make comparative measures, such as between test and theoretical surfaces. A reference wavefront represents the theoretical surface, and a test wavefront acquires information from the test surface. Both wavefronts start out identical, but the test wavefront is modified by an encounter with the test surface (e.g., reflection from the test surface). When recombined, a pattern of interference between the test and reference wavefronts can be interpreted to measure deviations of the test surface from the theoretical surface.

The interference pattern generally provides very accurate information regarding surface topology but little or no information regarding the size of the underlying object whose surface is being measured. For example, variations in spherical and cylindrical surfaces can be measured, while their diameters remain unknown. Non-interferometric measurements are ordinarily used for measuring diameter, but distance-measuring interferometry has also been used. The distance between an apex of a spherical surface and its center of curvature can be measured with a second interferometer by translating the spherical surface and counting the number of fringes (i.e., sinusoidal variations in intensity) between the two positions. However, the second interferometer and translating mechanism add cost and complexity.

The range of interferometric measurement in any one position is limited by wavelength, which is ordinarily less than one micron. The effective wavelength for a test surface measured by reflection is only half as much. The interference pattern is evaluated to determine a phase of the interfering wavefronts corresponding to each measured point. Information from the interference pattern provides measurements with extraordinary accuracy, but the phase values of the patterns are only unique within one effective wavelength. Surface discontinuities greater than one effective wavelength cannot be unambiguously measured because the number of separating wavelengths is not known.

Two-wavelength interferometry has been used to expand the range of interferometric measurement, generally at a cost of reduced accuracy. Interference patterns produced by two different wavelengths are superimposed to produce a combined interference pattern equivalent to the interference pattern that would be produced by a much longer wavelength. The two superimposed wavelengths "$\lambda_1$", and "$\lambda_2$" are related to the effective wavelength "$\lambda_e$" of the measure as follows:

$$\lambda_e = \frac{\lambda_1 \cdot \lambda_2}{|\lambda_1 - \lambda_2|}$$

Although the expansion in the measurement range is helpful for measuring rougher surfaces, absolute size generally remains well out of range. The further expansion of the measurement range is limited by a corresponding decrease in the accuracy of the measurement. For example, a 50 percent increase in range produces a 50 percent decrease in accuracy.

Accordingly, interferometers are normally used for measuring surface variations, while measures of overall size are more easily accomplished by non-interferometric means. The two types of measures (i.e., surface variation and size) have independent value for determining the quality of most test surfaces, so there is seldom any reason to relate them further. For example, spherical optics are separately measured for variations in sphericity and average radius. Adjustments in optical mounting positions can be used to compensate for errors in radius, but surface correction is generally required for errors is sphericity. Assigning actual radial dimensions to spherical surface variations is generally not useful and not very practical to accomplish.

However, it is of benefit to know actual radial dimensions of mating internal and external cylindrical surfaces. For example, the minimum diameter of the internal surface is compared to the maximum diameter of the external surface to assess the quality of their fit. Non-interferometric measurement means can be used for this purpose; but these are generally too slow, complicated, or not sufficiently accurate.

Grazing incidence interferometers have recently been developed by Tropel Corporation, the assignee of this application, to produce interference patterns measuring entire cylindrical surfaces. Previous interferometers relying on normal incidence interferometry could only view a portion of the surfaces' circumferences at any one time. An example of such a grazing incidence interferometer is described in co-assigned U.S. patent application Ser. No. 08/483,737, filed 7 Jun. 1995, in the name of John Bruning.

Leading and following diffractive optics straddle a cylindrical test surface along a common optical axis. The leading diffractive optic divides a planar primary wavefront into an axiconic test wavefront and an undisturbed planar reference wavefront. The axiconic test wavefront reflects from the entire circumference of a cylindrical test surface at a constant grazing angle. The following diffractive optic rediffracts the reflected test wavefront into a nominally planar wavefront in alignment with the undisturbed reference wavefront.

The diffractive optics are designed to produce a null interference pattern for a theoretically perfect cylindrical surface, so the resulting interference pattern records deviations of the actual test surface from the theoretical surface. The interference pattern accurately represents the topology of the test surface including the location of the maximum and minimum diameters, but does not provide any information about the size of the cylinder on which the surface is mapped. Accordingly, the absolute size of these diameters remain unknown.

SUMMARY OF INVENTION

My invention provides for measuring absolute dimensions of cylindrical surfaces, particularly the closest diameters of mating internal and external cylindrical surfaces. At least two measures are taken by a grazing incidence interferometer to obtain these dimensions. One of the measures produces a first interference pattern whose phase values are related to a known dimension, and another of the measures produces a second interference pattern whose phase values correspond to variations in a cylindrical test surface. The phase values of the two interference patterns are related to assign absolute values to the phase values in the second interference pattern.

Our preferred way of equating phase values to known dimensions involves use of a master cylinder having a known radial dimension such as average diameter. The master cylinder is mounted in the grazing incidence interferometer, and a first test beam is directed at grazing incidence to a cylindrical surface of the master cylinder. Preferably, the test beam envelops the entire circumference of the cylindrical surface along its entire length; but at a minimum, a plurality of angularly related diameters of the master cylinder are spanned along a portion of its length.

The test beam combines with a reference beam creating a first interference pattern representative of topographical variations between the cylindrical surface of the master cylinder and a cylindrical surface of a theoretical cylinder. The first interference pattern is evaluated to discount positioning differences between the master cylinder and the theoretical cylinder and to obtain a phase measure corresponding to the known radial dimension of the master cylinder's cylindrical surface.

A test cylinder is mounted in place of the master cylinder in the same interferometer. A second test beam directed at grazing incidence to a cylindrical surface of the test cylinder spans at least two angularly related diameters of the master cylinder. The second test beam combines with a second reference beam creating a second interference pattern representative of topographical variations between the cylindrical surface of the test cylinder and the theoretical cylindrical surface. The second interference pattern is also evaluated to discount positioning differences between the test cylinder and the theoretical cylinder and to obtain a phase measure of a radial dimension of the test cylinder's cylindrical surface. The phase measure of the radial dimension of the test cylinder's cylindrical surface is compared with the phase measure of the known radial dimension of the theoretical cylinder's cylindrical surface to equate the radial dimension of the test cylinder's cylindrical surface to an absolute value.

To provide unambiguous correspondence between similar phase measures of the two interference patterns, the average diameter of the test cylinder should match the known diameter of the master cylinder within (plus or minus) a range of measure represented by adjacent fringes of the interference patterns. However, additional variation between the diameters of the test and master cylinders can be accommodated by knowing the amount of the variation.

The equated phase measures correspond to a succession of absolute values separated by the distance represented by the adjacent fringes of the interference patterns. The amount of this distance is based on the effective wavelength of the test beam. A further measurement can be taken to determine which of the absolute values is closest to an actual dimension of the test cylinder.

Preferably, the further measurement is made with the same interferometer simultaneously with the measurement of the master and test cylinders. A third test beam reflects from the master's cylindrical surface at a grazing angle that is different from the grazing angle at which the first test beam reflects from the same surface. The third test beam combines with a reference beam producing a third pattern of interference representing deviations of the master cylinder's cylindrical surface from a theoretical surface. The first and third interference patterns are combined to produce a phase map corresponding to a fifth interference pattern whose adjacent fringes are spaced by a multiple of the spacing between adjacent fringes of the first and second interference patterns.

A fourth test beam reflects from the test cylinder's cylindrical surface at the same grazing angle as the third test beam and combines with a reference beam to produce a fourth interference pattern. The second and fourth interference patterns are combined to produce a phase map corresponding to a sixth interference pattern whose adjacent fringes are spaced similar to the fringes of the fifth interference pattern. After accounting for positioning errors, phase measures from the fifth and sixth interference patterns relating to corresponding radial dimensions are compared to determine a size difference between the master and test cylinders.

Measurements from the fifth and sixth interference patterns are less accurate than the corresponding measurements from the first and second interference patterns, but the range of measurement from the fifth and sixth interference patterns is much greater. The first and second interference patterns are used to provide accurate topographical information, and the fifth and sixth interference patterns are only needed to distinguish among the succession of absolute values that can be represented by phase measures of the second interference pattern. Accordingly, the average diameter of the test cylinder can vary by amounts beyond the range of the interferometric measurement used to map its surface topography while still obtaining absolute measures of the topography such as the maximum or minimum diameter of the test cylinder.

DETAILED DESCRIPTION

Figure 1:
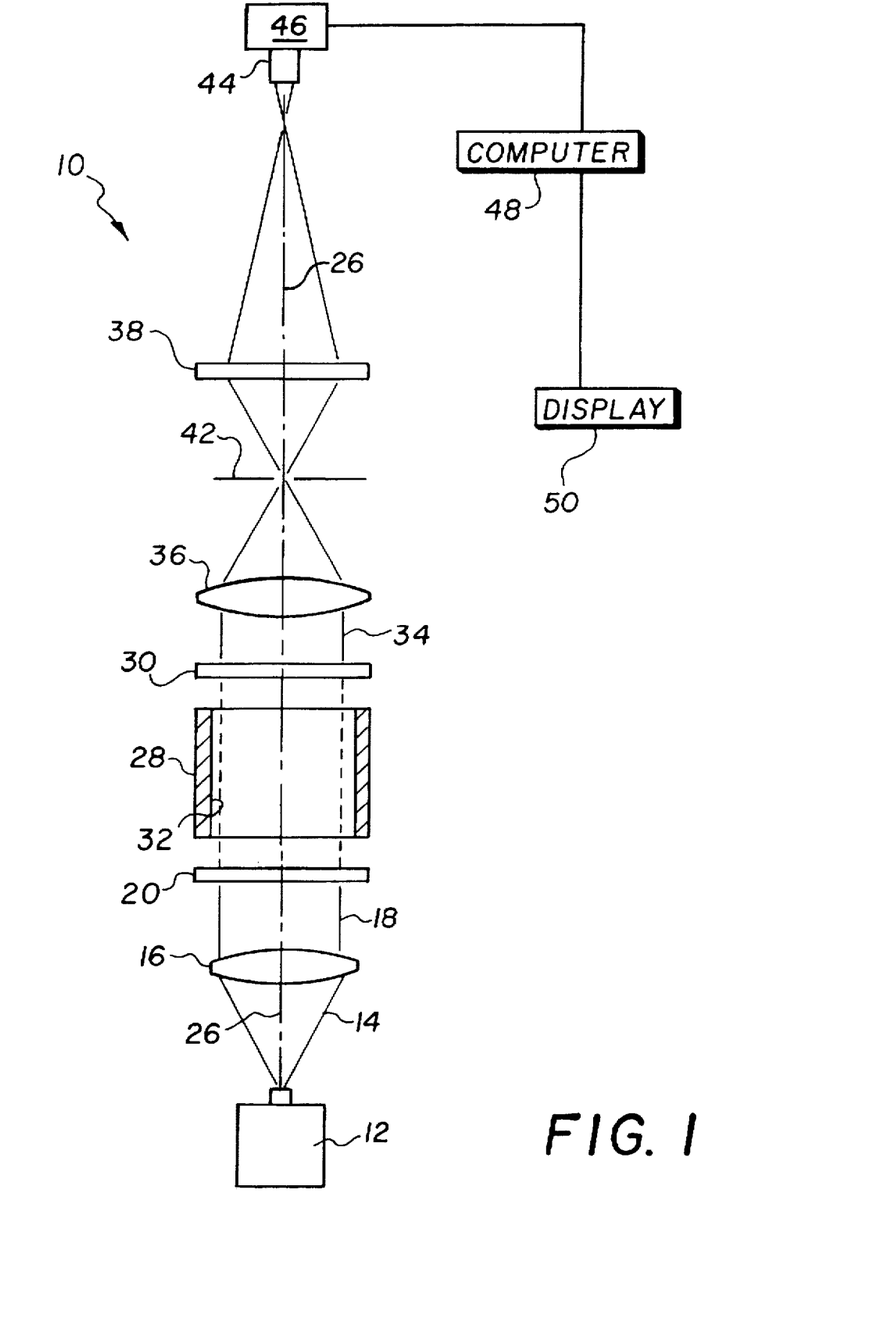
FIG. 1 is a diagram of a grazing incidence interferometer for use in my invention.

An exemplary grazing incidence interferometer 10 for practicing my invention is depicted in FIG. 1 in a Mach-Zender arrangement. A light source 12, such as a laser diode or a HeNe laser, produces a diverging beam 14 of coherent light. A collimator 16 reshapes the diverging beam 14 into a collimated primary beam 18 having a planar wavefront. A leading diffractive optic 20, such as a circular transmissive diffraction grating or binary optic, divides the primary beam 18 into a reference beam 22 and a test beam 24 (see FIG. 2). The reference beam 22 remains collimated as a planar wavefront. However, the test beam 24 is reshaped by the leading diffractive optic 20 into a converging beam having an axiconic wavefront composed of rays that are uniformly inclined to a reference axis 26 through a first diffraction angle "μ", which is measured within axial planes of the reference axis 26.

Figure 2:
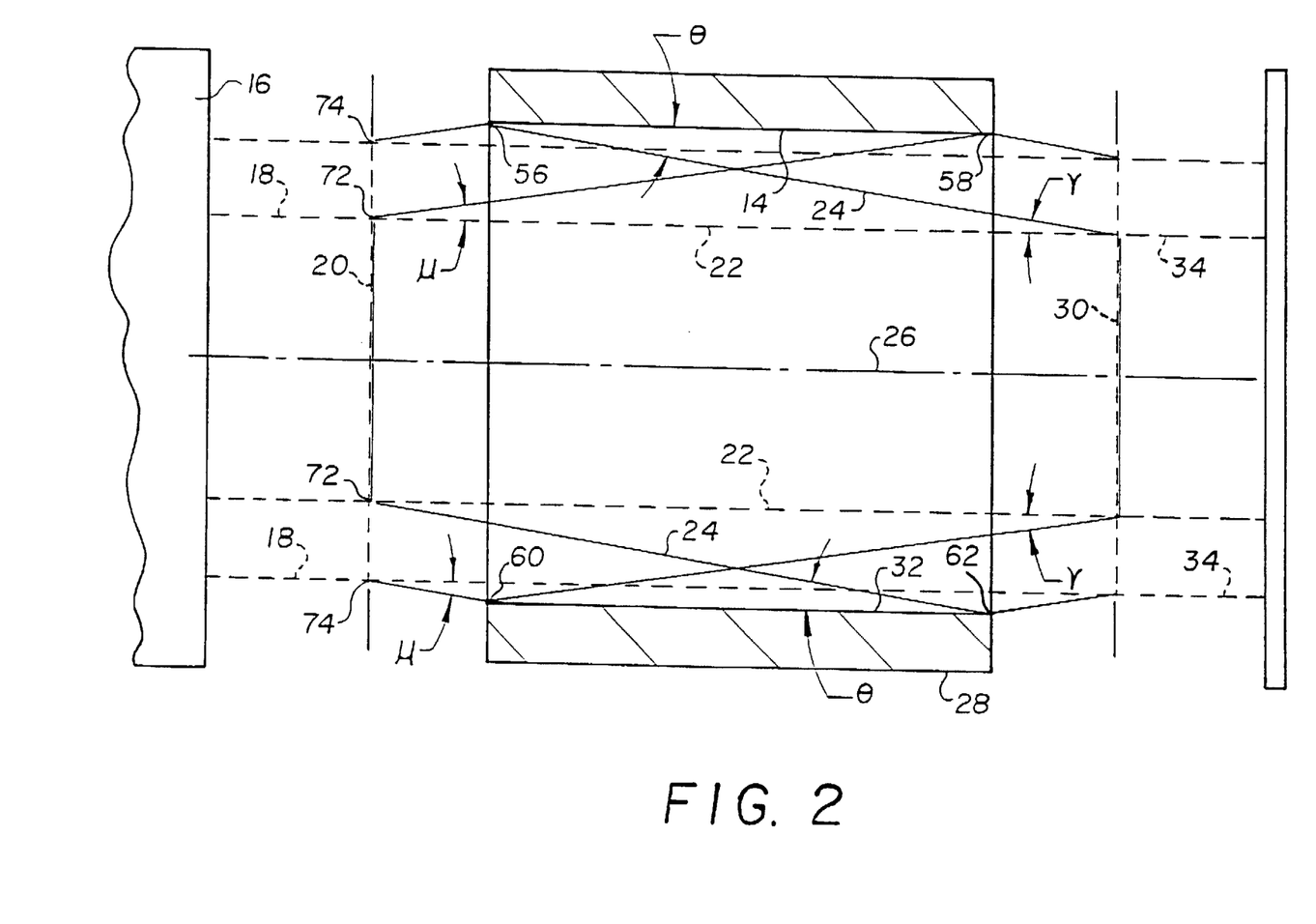
FIG. 2 is a diagram of a pair of diffractive optics used in the interferometer for measuring an internal cylindrical test surface.

The reference beam 22 and test beam 24 propagate along respective paths through a hollow center of an exemplary test cylinder 28 to a following diffractive optic 30. The test beam 24 reflects from different positions on an internal cylindrical surface 32 of the test cylinder 28 at a constant grazing angle "θ", which I define as a non-normal angle inclined from a test surface within a range of specular reflection. Angles of so-called "grazing incidence" are complementary to these "grazing angles". A following diffractive optic 30 further reshapes the reflected test beam 24 back into the collimated form of a planar wavefront through a second diffraction angle "ν". For measuring nominally straight cylindrical surfaces, the two diffraction angles "μ" and "ν" are equal to each other and to the constant grazing angle "θ".

The reference and test beams 22 and 24 emanate from the following diffractive optic 30 as a collimated combined beam 34 composed of interfering planar wavefronts. An image-forming optic 36 focuses the interfering planar wavefronts of the combined beam 34 as an image of the internal cylindrical surface 32 onto a diffuser plate 38. The resulting interference pattern (referred to as an interferogram) represents deviations of the test surface 32 from a theoretical cylindrical surface.

Preferably, the image-forming optic 36 has a high F-number so that the entire length of the internal cylindrical surface 32 is approximately equally resolved. An aperture stop 42 excludes light from other diffraction orders that emanate from the following diffractive optic 30 as non-collimated light. A zoom lens 44 relays an image of the interferogram from the diffuser plate 38 to an image-recording device, such as a camera 46. The image is sized, usually by demagnification, to best fill the recording area of the camera 46.

The camera 46, which preferably incorporates a solid state or a charge-coupled device (CCD), records the interference pattern for processing by a computer 48. A display device 50, such as a cathode-ray tube, flat panel device, or printer, displays information about the cylindrical test surface 32 in a useful form.

Alternatively, the information could be electronically stored or transmitted for use in another operation, such as feedback to a manufacturing operation.

Figure 3:
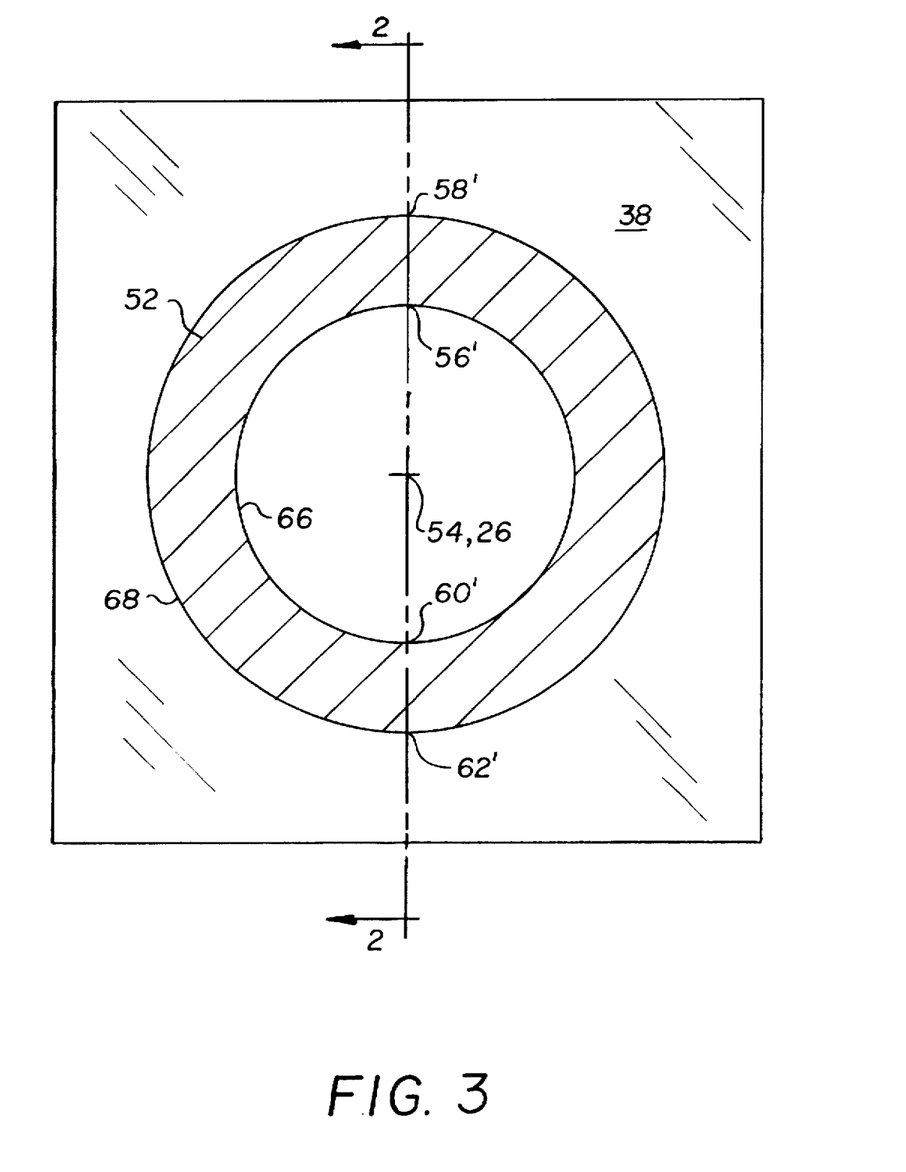
FIG. 3 is an axial view of a diffuser optic displaying an interference pattern representative of deviations in the test surface.

FIG. 3 depicts the annular interference pattern 52 that appears on the diffuser plate 38. A reference point 54 in the interference pattern 52 coincides with a point of intersection by the reference axis 26. Exemplary points of reflection 56, 58, 60, and 62 from the cylindrical test surface 14 correspond to points 56', 58', 60', and 62' in the interference pattern 52.

Angles about the reference axis 26 between the points of reflection 56, 58 and 60, 62 from the cylindrical test surface 14 correspond to similar angles between the points 56', 58' and 60', 62' about the reference point 54. However, axial distances along the reference axis 26 between the points of reflection 56, 60 and 58, 62 relate to radial distances between the points 56', 60' and 58', 62' from the reference point 54.

Height deviations of the cylindrical test surface 32 from the theoretical test surface at the points of reflection 56, 58, 60, and 62 appear as different phases at the corresponding points 56', 58', 60', and 62' in the interference pattern 52. Accurate measures of phase differences between the measured points are obtained by conventional phase shifting techniques in which optical path differences between the reference wavefront 22 and the test wavefront 24 are stepped through integer subdivisions of one wavelength. Intensity information at each phase step is stored, and a complete phase map is calculated by established Fourier series methods. The stepping can be accomplished in a variety of ways such as by axially translating one of the diffractive optics 20 or 30, preferably the following optic 30, or by changing the wavelength of the primary wavefront 18.

A gain factor "s" for the amount of height deviation in the test surface 32 represented by adjacent fringes in the interference pattern 52 is related to the actual wavelength "λ" of the test wavefront 24 and the grazing angle "θ" according to the following relationship:

$$s = \frac{\lambda}{2\sin\theta}$$

Increasing the grazing angle "θ" increases the accuracy of the phase measurements but limits the range of deviations that can be uniquely defined by measures of intensity alone. The quotient "λ/sin θ" found in the above relationship is referred to as an effective wavelength "λ1" of the test wavefront 24. Optical path differences that are a multiple of the effective wavelength "λ1" produce identical phases, so an assumption of surface continuity is needed to relate the deviations to each other.

Figure 4:
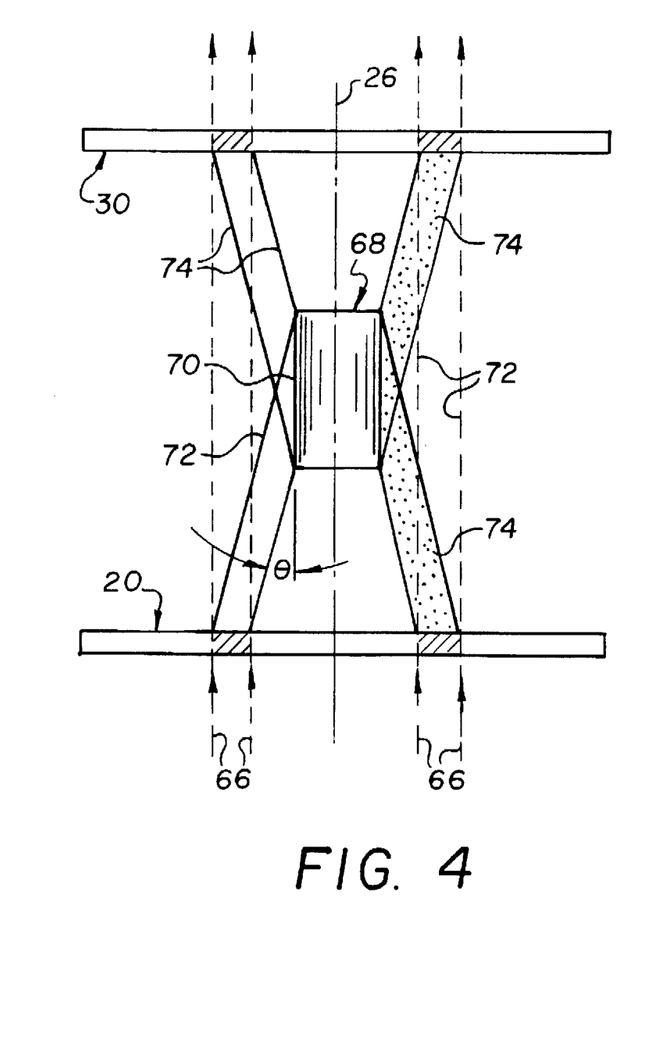
FIG. 4 is a diagram of the diffractive optics showing the measurement of a master cylinder.

My new method enables the deviations to be referenced in absolute terms such as points on a surface of known size. A first part of the method, which is illustrated by FIG. 4, involves calibrating the interferometer 10 to absolute dimensions. This is preferably carried out using a master cylinder 68 having a known average diameter. The master cylinder's cylindrical surface 70 is measured similar to the test cylinder 28 at the constant grazing angle "θ".

The leading diffractive optic 20 divides a planar primary wavefront 66 into a first planar reference wavefront 72 and a first axiconic test wavefront 74, both propagating along the reference axis 26. The first test wavefront 74 reflects from the entire circumference of the master cylinder's cylindrical surface 70 at the constant grazing angle "θ". The following diffractive optic 30 recombines the first reference and test wavefronts 72 and 74 producing a first interference pattern representing topographical variations between the master cylinder's cylindrical surface 70 and a theoretical cylindrical surface.

Data points from a phase map of the first interference pattern are fit to a surface equation for a cylinder. An exemplary cylindrical polynomial equation follows:

$$F(z, \phi) = \sum_{i,j} A_{ij} P_i(z) \left\{ \begin{array}{c} \cos(j\phi) \\ \sin(j\phi) \end{array} \right\}$$

where "$A_{ij}$" are coefficients, "$P_i(Z)$" are Legendre polynomials along length, and the trigonometric functions of "j" and "φ" are Fourier components of roundness. The first several Legendre polynomials are listed below:

P0 1
P1 z
P2 $(3z^2-1)/2$
P3 $(5Z^3-3z)/2$
P4 $(35z^4-30z^2+3)/8$
P5 $(63Z^5-70Z^3+15z)/8$

A further explanation of these functions is provided in a paper by Paul Glenn entitled "Set of orthonormal surface error descriptors for near-cylindrical optics" published in Optical Engineering, July/August 1984, Vol. 23, No. 4, pages 384–390.

The zero order of the surface equation is a constant term referred to as "piston"; the first order terms include decenter and tilt. These first order terms distinguish positioning differences between the master cylinder 68 and a theoretical cylinder, leaving the zero order piston term to represent the average radius of the master cylinder 68. The orthogonal nature of the surface equation permits these independent evaluations of piston and positioning differences.

From the data points of the interference pattern alone, the piston term is only known as a measure of phase or its equivalent surface height deviation. However, the average radius of the master cylinder is known so the phase measure representing average radius can be equated to the known average radius of the master cylinder. All other phase measures can be assigned absolute measurements by their calculated difference from the known average radius.

Figure 5:
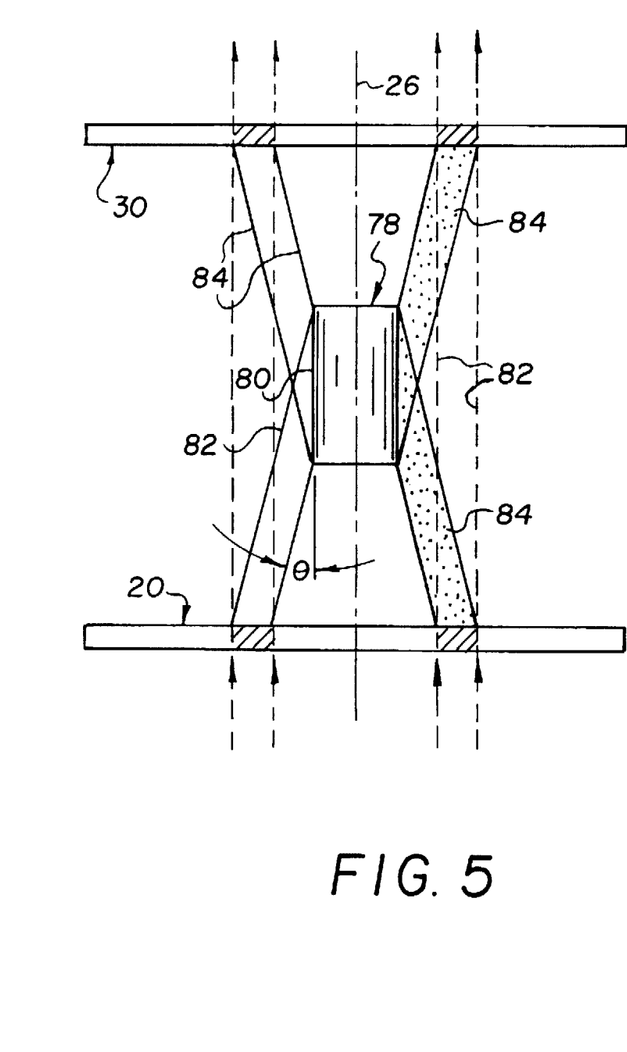
FIG. 5 is a diagram of the same diffractive optics showing the measurement of a test cylinder.

A second part of my method depicted in FIG. 5 involves the measurement of a cylindrical surface 80 of a test cylinder 78 using the same interferometer 10. Care is taken so that the leading and following diffractive optics 20 and 30 are in the same positions along the reference axis 26 as they were for the measurement of the master cylinder 68 or that any difference in position is exactly known. With the aid of the two diffractive optics 20 and 30, a second axiconic test wavefront 84 reflects from the entire circumference of the test cylinder's cylindrical surface 80 and is recombined with a second reference wavefront 82 for producing a second interference pattern representing topographical variations between the test cylinder's cylindrical surface 80 and a theoretical cylindrical surface.

The same surface equation is used to fit the data points of a phase map made from the second interference pattern. The resulting coefficients independently quantify an average radius of the test cylinder 78 and any positioning differences between the test cylinder 78 and the theoretical cylinder. Assuming that the average radius of the test cylinder 78 is within the equivalent of one fringe (see the gain factor above), then the phase differences between the piston terms of the surface equations fit to the master cylinder's surface 70 and the test cylinder's surface 80 represent the actual differences between their average radii.

Thus, the average radius of the test cylinder 78 is calculated from its measured difference from the known average radius of the master cylinder 68. With the piston term's dimension known absolutely, the dimensions of all other measured points on the test cylinder's surface are also known absolutely. A survey of these absolute dimensions is conducted to determine other relevant information including the minimum or maximum diameters of the test cylinder.

While the accuracy with which the absolute dimensions can be known is very high, the range of test cylinder sizes that can be measured unambiguously may be too narrow to accommodate manufacturing variations. For example, the gain factor for visible light (e.g., 633 nm) at a grazing angle of five degrees is less than four microns per fringe. Average diametric variations beyond eight microns in this example are indistinguishable from those less than eight microns.

Figure 6:
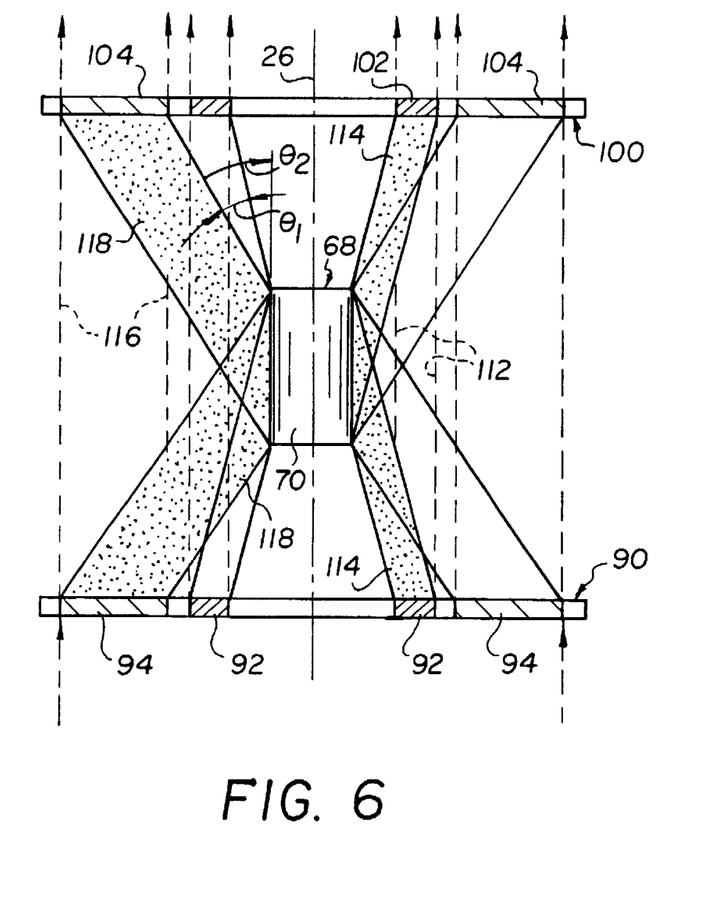
FIG. 6 is a diagram of substitute diffractive optics for simultaneously measuring the master cylinder at two different grazing angles.
Figure 7:
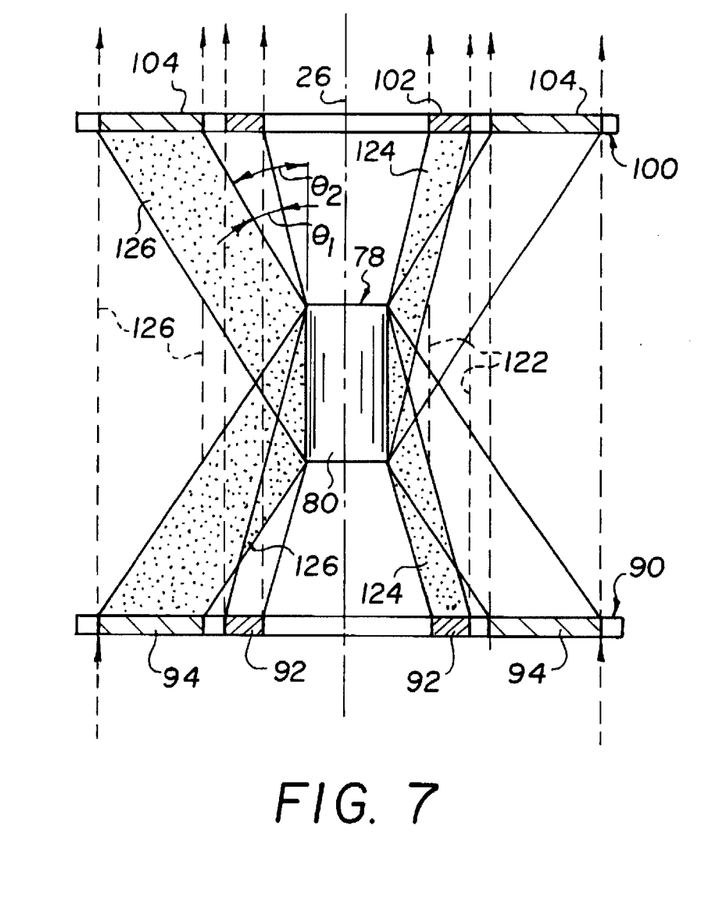
FIG. 7 is a diagram of the substitute diffractive optics for simultaneously measuring the test cylinder at two different grazing angles.

A third part of my method illustrated by FIGS. 6 and 7 provides for greatly expanding the range of test cylinder sizes that can be measured absolutely. Once calibrated to the master cylinder 68, each phase measure represents a succession of possible absolute radial dimensions separated by a distance corresponding to one fringe (e.g., approximately 4 microns). Another measurement is taken to determine the approximate size of the test cylinder 78 to determine which of the possible absolute radial dimensions is closest to the actual radial dimension of the test cylinder 78.

A separate measurement could be made for this purpose such as with a mechanical gauge. However, I prefer to perform the measurement on the same interferometer 10 contemporaneous with the measurements of the master cylinder 68 and the test cylinder 78, which saves time and is more reliable.

To accomplish the additional measurements, substitute leading and following diffractive optics 90 and 100 are provided with multiple annular diffraction zones 92, 94 and 102, 104. Inner annular zones 92 and 102 have a pitch required to diffract first and second test wavefronts 114 and 124 through common diffraction angles "$\mu_1$" and "$\nu_1$" for reflecting the first and second test wavefronts 114 and 124 from the master and test surfaces 70 and 80 at a constant grazing angle "$\theta_1$". Outer annular zones 94 and 104 have a pitch required to diffract third and fourth test wavefronts 118 and 128 through common diffraction angles "$\mu_2$" and "$\nu_2$", which are equal to grazing angle "$\theta_2$" at which the test wavefronts 118 and 128 are reflected from the master and test surfaces 70 and 80. The grazing angle "$\theta_2$" is different from the grazing angle "$\theta_1$" to vary effective wavelengths "$\lambda_2$" of the third and fourth test wavefronts 118 and 128 with respect to effective wavelengths "$\lambda_1$" of the first and second test wavefronts 114 and 124.

The first and second test wavefronts 114 and 124 are combined with first and second reference wavefronts 112 and 122 to produce first and second interference patterns similar to the interference patterns produced by the first and second test wavefronts 74 and 84 of FIGS. 4 and 5. The third and fourth test wavefronts 118 and 128 are combined with third and fourth reference wavefronts 116 and 126 to produce third and fourth interference patterns of the master and test surfaces 70 and 80.

During the measurement of the master cylinder 68, the first and third interference patterns are combined to produce a phase map corresponding to a fifth interference pattern whose adjacent fringes represent a multiple of the height deviations represented by adjacent fringes of the first interference pattern. The effective wavelength "$\lambda_e$" of the combined effective wavelengths "$\lambda_1$" and "$\lambda_2$" of the first and third test wavefronts 114 and 118 is given by the same equation describing two-wavelength interferometry as follows:

$$\lambda_e = \frac{\lambda_1 \cdot \lambda_2}{|\lambda_1 - \lambda_2|}$$

However, in contrast to ordinary two-wavelength interferometry, the actual wavelengths of the first and third test wavefronts 114 and 118 are preferably identical. The gain factor of height deviation per fringe of the combined interference pattern is equal to one-half of the effective wavelength "$\lambda_e$".

The same polynomial surface equation described earlier is once again fit to the phase measures of the fifth interference pattern yielding a phase measure in degrees or its equivalent height deviation corresponding to the piston term.

During measurement of the test cylinder 78, the second and fourth interference patterns are combined to produce a phase map representing a sixth interference pattern measuring deviations between the test surface 80 and a theoretical surface similar to the individual second and fourth interference patterns but at a much larger scale (i.e., gain factor). The enlarged scale, however, matches the scale of the fifth interference pattern produced by combining the first and third interference patterns.

Phase values of the sixth interference pattern are also fit to the same surface equation, which separates positioning differences between the test and theoretical cylinders and assigns a phase measure to the average radius of the test cylinder 78. Assuming that the average radius of the test cylinder 78 matches the average radius of the master cylinder 68 within a radial deviation represented by one fringe of the combined interference patterns, then the difference between the piston values from the fifth and sixth interference patterns measures the actual difference between the average radii of the test and master cylinders 68 and 78.

Once this difference is known, the closest absolute radial dimension corresponding to the piston term from the second interference pattern can be chosen. Thus, the test surface 80 is measured absolutely to the accuracy of the first and second interference patterns, while the combined fifth and sixth interference patterns are only used to resolve overall size ambiguities beyond the range of unique phases of the first and second interference patterns.

Preferably, the inner zones 92 and 102 of the diffractive optics 90 and 100 are sized so that second test wavefront 124 encompasses substantially all of test cylinder's cylindrical surface 80 to provide a comprehensive measure of surface topology. However, the outer zones 94 and 104 of the same optics can be much narrower, because their primary purpose is only to resolve phase ambiguities of the measurements through the inner zones 92 and 102. However, with appropriate sizing, the functions of the inner and outer zones can be reversed. Further details of compound diffractive optics useful for these purposes are disclosed in copending U.S. patent application Ser. No. 08/509,161, filed 31 Jul. 1995, which is hereby incorporated by reference.

Although the average diameter of the master cylinder is preferably known, any particular diameter of the master cylinder can be used. The location of the particular diameter is equated to the location of a corresponding diameter of the theoretical cylinder. The phase measures of the particular diameter are related to the phase measure of the piston term to determine the average diameter of the master cylinder, which can be used as a reference for assigning absolute dimensions to phase measures of similarly measured test cylinders.

I claim:

1. A method for measuring absolute dimensions of cylindrical surfaces with a grazing incidence interferometer comprising the steps of:

mounting a master cylinder having a known absolute dimension in an interferometer;

directing a first test beam at grazing incidence to a cylindrical surface of the master cylinder spanning at least two angularly related diameters of the master cylinder;

combining the first test beam with a first reference beam creating a first interference pattern representative of topographical variations in the cylindrical surface of the master cylinder with respect to a theoretical cylindrical surface;

evaluating the first interference pattern to determine positioning differences between the master cylinder's cylindrical surface and the theoretical cylindrical surface;

relating the topographical variations and positioning differences between the master cylinder's cylindrical surface and the theoretical cylindrical surface to the known absolute dimension of the master cylinder for assigning absolute values to phase measurements in the first interference pattern;

mounting a test cylinder in place of the master cylinder in the interferometer;

directing a second test beam at grazing incidence to a cylindrical surface of the test cylinder spanning at least two angularly related diameters of the master cylinder;

combining the second test beam with a second reference beam creating a second interference pattern representative of topographical variations between the cylindrical surface of the test cylinder and the theoretical cylindrical surface;

evaluating the second interference pattern to determine positioning differences between the test cylinder's cylindrical surface and the theoretical cylindrical surface; and relating the topographical variations and positioning differences between the test cylinder's cylindrical surface and the theoretical cylindrical surface to the absolute values assigned to the phase measurements in the first interference pattern for obtaining absolute dimensional measurements of the test cylinder's cylindrical surface from the phase measurements in the second interference pattern.

2. The method of claim 1 in which the known absolute dimension of the master cylinder is an average radius.

3. The method of claim 2 in which said step of evaluating the first interference pattern includes fitting a first surface equation to the topographical variations of the master cylinder's cylindrical surface.

4. The method of claim 3 in which the first surface equation includes first order terms expressing the positioning differences between the master and theoretical cylinders and a zero order term expressing a phase measurement corresponding to the average radius of the master cylinder.

5. The method of claim 4 in which the known radius of the master cylinder is equated to the zero order term to assign absolute values to phase measurements in the first interference pattern.

6. The method of claim 5 in which said step of evaluating the second interference pattern includes the further step of fitting a second surface equation to the topographical variations of the test cylinder's cylindrical surface.

7. The method of claim 6 in which the first surface equation includes first order terms expressing the positioning differences between the test and theoretical cylinders and a zero order term expressing a phase measurement corresponding to the average radius of the test cylinder.

8. The method of claim 7 in which the phase measurement corresponding to the average radius of the test cylinder is compared to the phase measurement corresponding to the average radius of the master cylinder to assign absolute values to phase measurements in the second interference pattern.

9. The method of claim 1 in which the known absolute dimension of the master cylinder is a diameter at a particular location on the master cylinder's cylindrical surface.

10. The method of claim 9 in which said step of relating the topographical variations includes relating the location of the diameter on the master cylinder's cylindrical surface with a corresponding location of the diameter in the first interference pattern.

11. The method of claim 1 in which the cylindrical surface of the test cylinder is an internal cylindrical surface and the absolute values of the phase measurements in the second interference pattern are compared to measure a minimum diameter of the test cylinder.

12. The method of claim 1 in which the cylindrical surface of the test cylinder is an external cylindrical surface and the absolute values of the phase measurements in the second interference pattern are compared to measure a maximum diameter of the test cylinder.

13. The method of claim 1 in which said step of directing the first test beam includes reflecting the first test beam from the master cylinder's cylindrical surface at a first grazing angle and further comprising a step of reflecting a third test beam from the master cylinder's cylindrical surface at a second grazing angle.

14. The method of claim 13 including the further step of combining the third test beam with a third reference beam creating a third interference pattern representative of topographical variations in the cylindrical surface of the master cylinder.

15. The method of claim 14 including the further step of combining the first and third interference patterns for deriving a combined interference pattern measuring topographical variations in the master's cylindrical surface at a larger scale.

16. The method of claim 15 including the further step of reflecting a fourth test beam from the test cylinder's cylindrical surface at the second grazing angle.

17. The method of claim 16 including the further step of combining the fourth test beam with a fourth reference beam creating a fourth interference pattern representative of topographical variations in the cylindrical surface of the test cylinder.

18. The method of claim 17 including the further step of combining the second and fourth interference patterns for deriving a combined interference pattern measuring topographical variations in the test cylinder's surface at the larger scale.

19. The method of claim 18 in which a difference between the measurements of the combined interference patterns is used to resolve an ambiguity between measurements of the first and second interference patterns for assigning absolute dimensional measurements of the test cylinder's cylindrical surface from the phase measurements in the second interference pattern.

20. A method of obtaining absolute radial measures of cylindrical surfaces comprising the steps of:

reflecting a substantially axiconic test wavefront from a cylindrical surface of a test cylinder;

combining the reflected test wavefront with a reference wavefront for producing a pattern of interference representing deviations of the cylindrical surface from a theoretical surface;

producing a phase map of the interference pattern containing measures of phase at different locations on the phase map corresponding to different locations on the cylindrical surface;

equating a particular phase measure to a succession of absolute radial measures separated by a distance represented by adjacent fringes of the interference pattern;

performing a separate measurement to determine which of the absolute radial measures is closest to an absolute radial dimension of the test cylinder; and relating the phase measures of the phase map to each other and to the closest absolute radial dimension for determining absolute radial dimensions of the test cylinder corresponding to the phase measures.

21. The method of claim 20 in which said step of reflecting includes reflecting a first test wavefront from the cylindrical surface at a first grazing angle and said step of performing a separate measurement includes reflecting a second test wavefront from the cylindrical surface at a second grazing angle.

22. The method of claim 21 in which said second test wavefront reflects from a smaller area of the cylindrical surface than the first test wavefront.

23. The method of claim 21 in which said step of performing a separate measurement includes the further steps of:

combining the reflected second test wavefront with a reference wavefront for producing a second pattern of interference representing deviations of the cylindrical surface from a theoretical surface, and producing a phase map corresponding to a combined interference pattern whose adjacent fringes are spaced by a multiple of the distance separating adjacent fringes of the first interference pattern.

24. The method of claim 23 in which a phase measure of the combined interference pattern is used to determine which of the absolute radial measures is closest to an absolute radial dimension of the test cylinder.

25. The method of claim 20 in which said step of equating includes measuring a master cylinder having a known radial dimension using the same interferometer that is used in said steps of reflecting and combining.

26. The method of claim 25 in which said step of equating further includes:

relating a particular phase measure to the known radial dimension of the master, and determining the succession of other absolute radial values corresponding to the particular phase measure by appending progressive multiples of the distance represented by the adjacent fringes.

27. A method of obtaining an absolute dimension of a cylindrical surface of a test cylinder with a grazing incidence interferometer comprising the steps of:

performing a first interferometric measure with the grazing incidence interferometer producing a first interference pattern representing deviations of a master cylinder's cylindrical surface from a cylindrical surface of a theoretical cylinder;

evaluating a phase map of the first interference pattern to obtain a phase measure of a radial dimension of the master cylinder's cylindrical surface;

equating the phase measure of the master cylinder's cylindrical surface to an absolute dimension;

performing a second interferometric measure with the same grazing incidence interferometer producing a second interference pattern representing deviations of the test cylinder's cylindrical surface from the cylindrical surface of the theoretical cylinder;

evaluating a phase map of the second interference pattern to discount positioning differences between the test cylinder and the theoretical cylinder and to obtain a phase measure of a radial dimension of the test cylinder's cylindrical surface; and comparing the phase measure of the radial dimension of the test cylinder's cylindrical surface with the phase measure of the radial dimension of the master cylinder's cylindrical surface to equate the radial dimension of the test cylinder's cylindrical surface to an absolute dimension.

28. The method of claim 27 in which said step of evaluating a phase map of the first interference pattern includes discounting positioning differences between the master cylinder and the theoretical cylinder.

29. The method of claim 28 in which said steps of evaluating the phase maps of the first and second interference pattern include fitting surface equations to the phase maps to obtain phase measures corresponding to an average radii of the master and test cylinders.

30. The method of claim 29 in which said step of comparing includes comparing the phase measures corresponding to the average radii of the master and test cylinders to measure a difference between their average radii.

31. The method of claim 27 in which said step of comparing includes equating the radial dimension of the test cylinder's cylindrical surface to a succession of absolute radial measures.

32. The method of claim 31 including the further steps of:

performing a third interferometric measure with the grazing incidence interferometer producing a third interference pattern representing deviations of the master cylinder's cylindrical surface from a cylindrical surface of a theoretical cylinder, performing a fourth interferometric measure with the grazing incidence interferometer producing a fourth interference pattern representing deviations of the test cylinder's cylindrical surface from a cylindrical surface of a theoretical cylinder, combining the first and third interference patterns to produce a fifth interference pattern, and combining the second and fourth interference patterns to produce a sixth interference pattern.

33. The method of claim 32 including the further steps of:

evaluating a phase map of the fifth interference pattern to obtain a phase measure of a radial dimension of the master cylinder's cylindrical surface, evaluating a phase map of the sixth interference pattern to obtain a phase measure of a radial dimension of the test cylinder's cylindrical surface, and comparing the phase measure from the fifth interference pattern to the phase measure of the sixth interference pattern to obtain a measure of the difference between the radial dimensions of the master and test cylinders.

34. The method of claim 33 in which the difference measure is used to determine which of the succession of radial measures is closest to an absolute radial dimension of the test cylinder.

* * * * *